No. 634,753. Patented Oct. 10, 1899.
B. IBELLI.
COMBINATION TOOL.
(Application filed July 13, 1899.)
(No Model.)
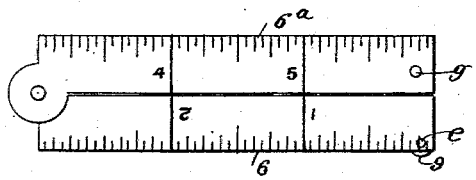
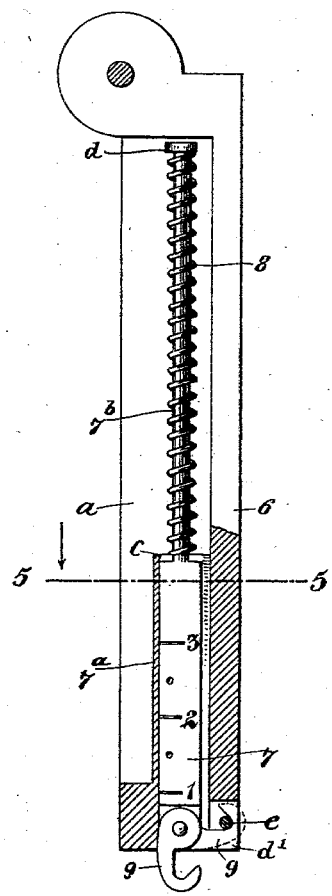
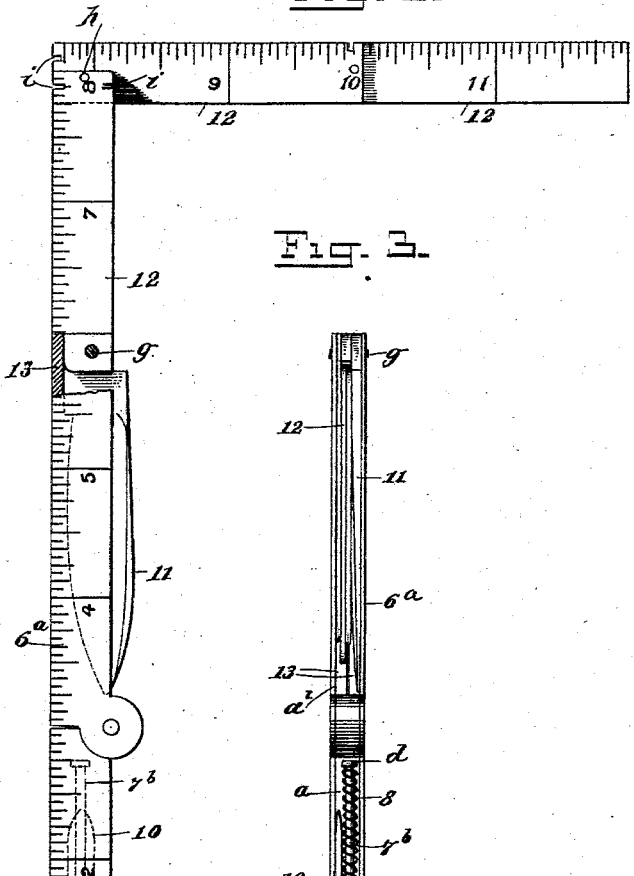
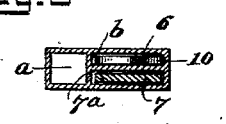
WITNESSES:
Geo. W. Taylor
Wm. P. Patton
INVENTOR
B. Ibelli
BY
ATTORNEYS

UNITED STATES PATENT OFFICE.

BENIAMINO IBELLI, OF NEW YORK, N. Y.

COMBINATION-TOOL.

SPECIFICATION forming part of Letters Patent No. 634,753, dated October 10, 1899.

Application filed July 13, 1899. Serial No. 723,691. (No model.)

*To all whom it may concern:*

Be it known that I, BENIAMINO IBELLI, of the city of New York, borough of Brooklyn, in the county of Kings and State of New York, have invented new and useful Improvements in Combination-Tools, of which the following is a full, clear, and exact description.

This invention is a combination-tool used mainly for mechanical purposes, and has for its object to provide a small portable device wherein are combined a two-part foldable rule the members of which are recessed to receive a jointed knife-blade, an extensible graduated measure that will form a square when partially folded, a weighing device having a compressible spring to define degrees of weight on an extension-bar, a foldable hook on said bar, and a manicure-tool.

The invention consists in the peculiar construction and combination of parts, as is hereinafter described, and defined in the claims.

Reference is to be had to the accompanying drawings, forming a part of this specification, in which similar characters of reference indicate corresponding parts in all the figures.

Figure 1 is a side view of the combination-tool folded. Fig. 2 is a side view of the same, showing the measure opened out from the hollow rule-section it normally occupies and adjusted as a square. Fig. 3 is an edge view of the two-part rule opened and exposing details contained therein. Fig. 4 is an enlarged side view of one rule member, partly in section, showing the construction and arrangement of the spring-balance device held therein; and Fig. 5 is a transverse sectional view substantially on the line 5 5 in Fig. 4.

In carrying into effect the features of invention as illustrated, 6 6$^a$ indicate two half portions of a six-inch rule which are graduated in inches and fractions thereof, said graduations being placed on alining sides of the rule-sections, so as to serve as a measure of length which increases in value from one end of one rule-section to the outer end of the other section for convenient use when said rule-sections are unfolded, as shown in Fig. 2. Each rule-section 6 6$^a$ is recessed rectangularly from the inner edges of the same, thus affording cavities $a$ $a'$ therein of proper dimensions for the reception of the details to be hereinafter described.

In the rule-section 6 a weighing device is located, as shown in Figs. 3, 4, and 5, comprising a slide-bar 7, which is inserted longitudinally within a case 7$^a$, formed or secured in the cavity $a$ of the rule-section 5. The case 7$^a$ is of such transverse dimension as will afford another case $b$ at one side thereof for the reception of an implement used for manicuring purposes, as will be further mentioned.

The inner end portion of the slide-bar 7 is reduced in diameter and preferably rendered cylindrical, as at 7$^b$, having sufficient length to receive an enveloping spiral spring 8, which is held in place seated upon an inner end wall $c$ of the case 7$^a$, and the head $d$, formed or secured upon the end of the spring-carrying rod 7$^b$. The slide-bar 7 is graduated to provide a measuring-scale thereon, as shown in Fig. 4, and upon the end of the slide-bar which is nearest to the free end of the rule-section 6 a hook 9 is pivoted.

The case 7$^a$ at its end nearest the hook 9 intersects a lateral recess $d'$, formed in the free end of the rule-section 6, said recess being so located as to receive the hook 9 when it is folded, and thus obviate an objectionable protrusion of the hook when the slide-bar 7 is retracted and the rule-sections are folded together, as shown in Fig. 1. A keeper-bar $e$ extends across the recess $d'$ and has such a relative position as permits the bent end of the hook 9 to frictionally engage with said bar, as indicated by dotted lines in Fig. 4.

The manicuring implement 10 is of a form employed to scrape and file-dress the free edges of human finger-nails, and it is adapted to occupy the parallel case $b$ when pushed therein through a slit that intersects the end of the case and is formed in the free end of the rule-section 6 at one side of the case 7$^a$.

In the cavity $a'$, formed in the rule-section 6$^a$, the knife-blade 11 is pivoted, and at one side of the knife-blade one end portion of the foldable three-part measure 12 is pivoted on the same transverse pin $g$. The knife-blade 11 and end portion of the three-part measure 12 are engaged by the two spring back-pieces 13, that press upon the parts mentioned and hold them either extended or folded, one of said springs being shown sectionally in Fig. 2 and both partially in Fig. 3.

The measure 12 consists of three substantially equal pieces of thin plate metal, preferably strips of sheet-steel, and these triple sections are pivoted together by one end of each at such distances from the extremities thereof as to permit short portions to overlap each other at the pivot-points $h$, all these sections being graduated in inches and fractions thereof.

One end of one member of the three-part measure is pivoted on the transverse pin $g$, as before mentioned, and this adapts the measure to receive an extension from the rule portion $6^a$, and thus be alined therewith, as shown in Fig. 2, the spring 13 serving to hold the rule and measure members from lateral flexure until this is effected, designedly by manipulation.

If the two outermost members of the three-part measure 12 are alined with each other and then disposed at a right angle to the other member, which projects in alinement with the two extended members 6 $6^a$ of the rule, which adjustment will be indicated by the registering of notches $i$, formed in the end of the middle member and outer edge of the member it is at an angle to, the rule members and measure as adjusted form a square of considerable size well adapted for the use of carpenters or other mechanics.

It is evident that by the extension of the two outermost members of the three-part measure 12 a rule or graduated measure one foot in length is afforded, thereby doubling the extent of the rule formed of the sections 6 $6^a$.

I am aware that a spring-balance has been placed in a hollow rule-section before this example of such a construction, but such spring-balances operated by the extension of the spring, and in a small balance the spring from repeated stretching quickly became unreliable and the balance untrue. To obviate this defect, I have provided means for utilizing a spring by its compression, whereby increased accuracy, as well as greater durability, is afforded for the spring-balance so constructed.

The provision of a foldable hook 9 on the end of the slide-bar 7 is very essential, as it facilitates the operation of the scale, and when not in service the hook can be housed in the recess $d'$, and thus avoid an objectionable projection of the hook 9 when the rule and parts it contains are in folded adjustment, as shown in Fig. 1, thus adapting the composite rule to be carried in the pocket.

Having thus described my invention, I claim as new and desire to secure by Letters Patent—

1. The combination with a two-part jointed rule having a hollow section divided into two cases, one case receiving a manicure implement, of a weighing device in the other case, comprising a graduated slide-bar, one portion of which is reduced to rod form and is slidable through the inner end wall of the case, a spiral spring mounted on said rod and pressed upon one end thereof by a headed enlargement on the rod, and a hook pivoted upon the extensible end of the slide-bar, which hook is foldable laterally in a recess at the end of the rule-section, and is held folded therein by frictional engagement with a transverse keeper-bar.

2. The combination with a two-part jointed rule, graduated on sides of the rule-sections, both rule-sections being recessed and open at the inner edges thereof, of a weighing device in one rule-section, and a thin three-part measure having its members jointed to fold or extend in sequence, said measure being extensible in alinement with extended sections of the rule to provide a one-foot measure, and also adjustable to form a square, that is accurately defined by registering notches that are formed in the edges of two of the measure members near their pivot-joint.

3. A combination-tool, comprising a rule having its two jointed members hollow, a knife-blade in one hollow rule-section, and a weighing-scale in the other rule-section adapted to weigh by compression of a spring indicating on a graduated slide-bar, a foldable hook on the extensible end of the slide-bar, which hook is completely housed in a recess at the end of the rule-section the slide-bar works in, and a keeper-bar extending across the recess and frictionally engaged by the hook when it is folded.

BENIAMINO IBELLI. [L. S.]

Witnesses:
EMILIO CRISTIANI,
FELIX SANITOI.